(12) United States Patent
Schoenborn

(10) Patent No.: US 10,753,516 B2
(45) Date of Patent: Aug. 25, 2020

(54) FLARED EXHAUST GAS PRESSURE TUBE HAVING KEYED WASHER

(71) Applicant: Ford Global Technologies, LLC, Dearborn, MI (US)

(72) Inventor: Robert Schoenborn, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 587 days.

(21) Appl. No.: 15/359,695

(22) Filed: Nov. 23, 2016

(65) Prior Publication Data
US 2018/0142812 A1    May 24, 2018

(51) Int. Cl.
| | |
|---|---|
| *F16L 19/04* | (2006.01) |
| *F16L 15/00* | (2006.01) |
| *F01N 13/00* | (2010.01) |
| *B21D 39/06* | (2006.01) |
| *B21D 41/02* | (2006.01) |
| *F16L 15/08* | (2006.01) |

(52) U.S. Cl.
CPC ............ *F16L 15/006* (2013.01); *B21D 39/06* (2013.01); *B21D 41/026* (2013.01); *F01N 13/00* (2013.01); *F01N 13/008* (2013.01); *F16L 15/08* (2013.01); *F01N 2450/22* (2013.01); *F01N 2450/28* (2013.01)

(58) Field of Classification Search
CPC ..... F16L 19/04; F16L 19/0206; F16L 19/028; F16L 19/0283; F16L 19/0286; F16L 19/041
USPC .................. 285/384, 289.1, 289.2, 401, 402
See application file for complete search history.

(56) References Cited

U.S. PATENT DOCUMENTS

| | | | | |
|---|---|---|---|---|
| 533,150 | A * | 1/1895 | Trethewey et al. | F16L 19/04 285/246 |
| 1,820,020 | A * | 8/1931 | Hewitt | F16L 19/0206 285/12 |
| 2,249,469 | A * | 7/1941 | Gray | F16L 41/02 138/40 |
| 2,316,711 | A * | 4/1943 | Parker | F16L 19/04 285/334.5 |
| 2,362,686 | A * | 11/1944 | De Lano | F16L 19/04 285/115 |
| 2,423,632 | A * | 7/1947 | Ansorge | F16L 33/222 285/249 |
| 2,430,657 | A * | 11/1947 | Zolleis | F16L 19/041 285/334.1 |
| 2,490,620 | A * | 12/1949 | Cole | F16L 19/045 285/334.5 |
| 2,645,099 | A * | 7/1953 | Cumming | F25B 41/067 62/511 |
| 2,748,463 | A * | 6/1956 | Mueller | F16L 19/028 29/523 |

(Continued)

FOREIGN PATENT DOCUMENTS

| | | |
|---|---|---|
| CN | 103016862 | 4/2013 |
| JP | 2015102194 | 6/2015 |

*Primary Examiner* — David Bochna

(57) ABSTRACT

An exhaust gas pressure tube assembly and a method for making the tube are disclosed. The assembly includes a keyed washer having a concave conical opening and an exhaust gas pressure tube having an open end for attachment to the boss. The assembly method includes positioning the washer adjacent the boss attachment open end of the pressure tube such that the concave conical opening of the washer faces the open end. A tool is positioned against a washer side and a mandrel having a conical outer surface is then inserted into the open end, causing the open end to be flared against the opening of the washer. The surface of the concave conical opening of the washer may be either smooth or knurled. If the surface is smooth, the mandrel is retained (Continued)

in its flaring position and a brazing or similar procedure to form a strong and gas-tight seal.

12 Claims, 5 Drawing Sheets

(56) References Cited

U.S. PATENT DOCUMENTS

| | | | | |
|---|---|---|---|---|
| 3,501,171 A | * | 3/1970 | Baron | F16L 19/0206 285/334.4 |
| 3,503,632 A | * | 3/1970 | Braun | F16L 23/04 285/48 |
| 3,556,568 A | * | 1/1971 | King | F16L 19/041 285/334.2 |
| 3,572,775 A | * | 3/1971 | Bloom | F16L 13/08 285/288.7 |
| 3,606,396 A | * | 9/1971 | Prosdocimo et al. | F16L 19/045 285/148.16 |
| 3,840,257 A | * | 10/1974 | Moore | F16L 19/046 285/334.3 |
| RE29,376 E | * | 8/1977 | Hiszpanski | F16L 19/0206 285/148.9 |
| 4,095,826 A | * | 6/1978 | Borradori | F16L 19/08 285/330 |
| 4,236,736 A | * | 12/1980 | Anderson | F16L 33/224 285/125.1 |
| 4,873,823 A | | 10/1989 | Curths | |
| 5,088,774 A | * | 2/1992 | Spiegelman | F16L 39/005 285/123.1 |
| 5,538,294 A | * | 7/1996 | Thomas | F16L 9/06 138/128 |
| 6,595,558 B2 | | 7/2003 | Kusanagi | |
| 8,186,724 B2 | | 5/2012 | Kato et al. | |
| 2006/0028017 A1 | * | 2/2006 | Sausner | F16L 19/028 285/136.1 |
| 2006/0157983 A1 | * | 7/2006 | Lyons | G01N 30/6026 285/353 |

\* cited by examiner

FLARED EXHAUST GAS PRESSURE TUBE HAVING KEYED WASHER

TECHNICAL FIELD

The disclosed inventive concept relates to exhaust systems for vehicles. More particularly, the disclosed inventive concept relates to pressure tubes for exhaust systems. The pressure tube includes a keyed washer that provides and maintains proper orientation of the exhaust gas pressure tube assembly relative to the exhaust manifold. To prepare the exhaust gas pressure tube assembly, a keyed washer is first fitted near an end of the pressure tube and the end is then flared. The keyed washer is preferably attached to the flared end by a brazing procedure such as heat or induction brazing.

BACKGROUND OF THE INVENTION

The modern internal combustion engine relies on a relatively complex emissions control system to reduce the volume of undesirable tailpipe gases. One of the important targets of the emission control system is the control of $NO_x$ formed in the combustion chamber of the engine. The $NO_x$ is the result of the combination of oxygen and nitrogen burned at a high temperature.

Modern internal combustion engines typically rely on Exhaust Gas Recirculation (EGR) to reduce $NO_x$ emissions. The EGR system recirculates a portion of the exhaust back into the intake air for re-combustion. The EGR system includes a gas pressure sensor and an exhaust gas pressure tube positioned between the exhaust manifold and the exhaust gas pressure sensor. Working in a high heat environment (with temperature reaching about 900° C.), the exhaust gas pressure tube separates the exhaust gas pressure sensor from the heat of the exhaust manifold.

According to known techniques, exhaust gas pressure tubes are manufactured by first flaring the open end of the tube followed by positioning a thrust nut on the tube. The thrust nut of the exhaust gas pressure sensor tube assembly is then threaded into a boss formed on the exhaust manifold. The flare on the exhaust gas pressure tube positioned against the boss seals the tube relative to the exhaust manifold.

The known techniques present increasing challenges to the installation of the exhaust gas pressure tube in the engine compartment which is increasingly crowded due to the ever-increasing number of components necessary for proper engine operation and emission control. It is highly desirable to provide some way of properly orienting the exhaust gas pressure tube during installation and maintaining that orientation after installation. This is because on an angled exhaust gas pressure tube there is no positional rotational alignment within the tube assembly. The tube could be installed at any rotational angle, thus leaving it up to the installer to properly align the pressure tube between the exhaust manifold boss and the pressure sensor. The result is a potentially inconsistent assembly from vehicle to vehicle. This rotational issue might be resolved if enough pressure on the flare is applied by the thrust nut. However, this result is not always easy to achieve and may result in over-torqueing of the thrust nut and possible damage to the exhaust manifold attachment boss.

To this end, and as part of the present invention, a keyed washer for aligning the exhaust gas pressure tube relative to the exhaust manifold may be included in the assembly. However, simply adding the keyed washer to a tube that was already flared proved to be unsatisfactory due to the imperfect angles formed between the outer surface of the flared end and the adjacent surface of the washer. It was found that, for example, the flared area has a tendency to spring back at least partially toward its pre-flared condition. The net result was a seal that is often susceptible to leakage. Failure of a proper seal being formed between the exhaust gas pressure tube and the exhaust manifold, being an emission joint, could lead to warranty and customer dissatisfaction Accordingly, known methods of making exhaust gas pressure tubes for emission control systems for vehicles have not always produced satisfactory results. It would be useful to have an exhaust gas pressure tube assembly that provides both a tight seal and proper alignment features for use during installation. As in so many areas of vehicle technology, there is always room for improvement related to exhaust gas pressure tube assemblies used in the automotive vehicle.

SUMMARY OF THE INVENTION

The disclosed inventive concept is an exhaust gas pressure tube assembly for use between an exhaust manifold boss and an EGR system and a method for making the assembly. The exhaust gas pressure tube assembly includes a keyed washer having a concave conical opening and an exhaust gas pressure tube having an open end for attachment to the exhaust manifold boss. The keyed washer may be hardened or may be of a material that is sufficiently hard so as to transfer clamping force for sealing the flare. The washer may be formed from any of several materials including, for example, Fe—Ni—Cr alloy.

The method of assembling the exhaust gas pressure tube assembly of the disclosed inventive concept includes positioning the keyed washer adjacent the exhaust manifold boss attachment open end of the pressure tube such that the concave conical opening of the washer faces the open end. A mandrel having a conical outer surface is then inserted into the open end causing the open end to be flared against the concave conical opening of the washer, thereby fully seating the flared end of the tube against the conical opening of the washer.

The surface of the concave conical opening of the washer may be either smooth or knurled. If the surface is smooth, the mandrel is retained in its flaring position and a brazing or similar procedure is undertaken by which solder is flowed between the two components to form a strong and gas-tight seal. Preferably but not exclusively the brazing procedure is induction brazing. If, on the other hand, the surface of the concave conical opening of the washer is knurled, then the mandrel is used to mate the outer surface of the flared end to the conical concave surface of the washer.

By starting with a hardened washer (or with a washer that is hard enough for the particular purpose) and then flaring the tube against the concave conical surface of the washer, gaps that would otherwise arise according to conventional assembly techniques are avoided. According to one assembly embodiment of the disclosed inventive concept, the elimination of gaps is assured by mating the flared end of the exhaust gas pressure tube and the washer together by brazing. The disclosed method of forming the exhaust gas pressure tube assembly assures that a proper seal will be achieved when the assembly is attached to the exhaust manifold pressure tube boss.

Furthermore, provision of the key on the washer according to the disclosed inventive concept assures that, once in position, the exhaust gas pressure tube assembly will not rotate away from this original position. This restricts the exhaust gas pressure tube assembly from being initially positioned or subsequently moved to any rotation angle.

The method of making an exhaust gas pressure tube assembly may be applied to any technology in which a relatively low pressure (e.g., 15 psi) liquid or gas connection is required. For example, the assembly and method of making the assembly may be used in other areas of the vehicle, such as fuel and brake lines. In addition, the method of the disclosed inventive concept may be used to make connections for both gas and water lines in home and commercial applications.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
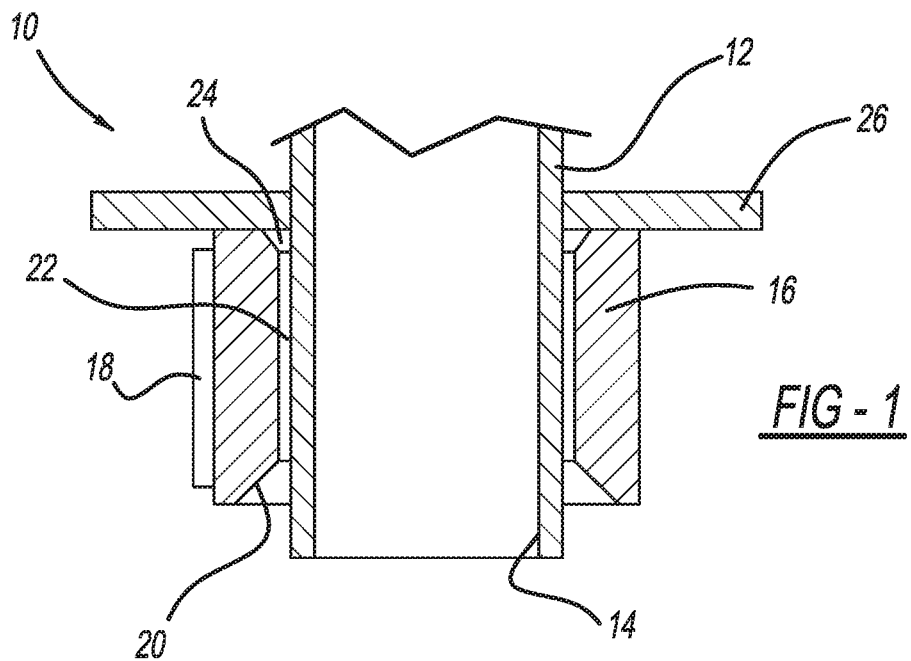
FIG. 1 is a sectional view of an exhaust gas pressure tube having a keyed washer preliminarily positioned near one end of the tube according to a first embodiment of the disclosed inventive concept, the keyed washer having a conical interior wall, the conical interior wall having a smooth surface.

In the following figures, the same reference numerals will be used to refer to the same components. In the following description, various operating parameters and components are described for different constructed embodiments. These specific parameters and components are included as examples and are not meant to be limiting.

The accompanying figures and the associated description illustrate the keyed exhaust gas pressure tube that utilizes a keyed washer in the manufacturing process to create a flared seal according to the disclosed inventive concept. Two embodiments of the disclosed inventive concept are illustrated. In one embodiment, that illustrated in FIGS. 1-3, the inner concave conical wall of the keyed washer is smooth and the flared end of the pressure tube is attached to the keyed washer by a brazing procedure such as heat or induction brazing. In the other embodiment, that illustrated in FIGS. 4-6, the inner concave conical wall of the keyed washer is knurled. It is to be understood that the shapes of the embodiments of the keyed exhaust gas pressure tube illustrated in the figures is only illustrative as other shapes may be possible without deviating from the spirit and scope of the disclosed inventive concept.

Figure 2:
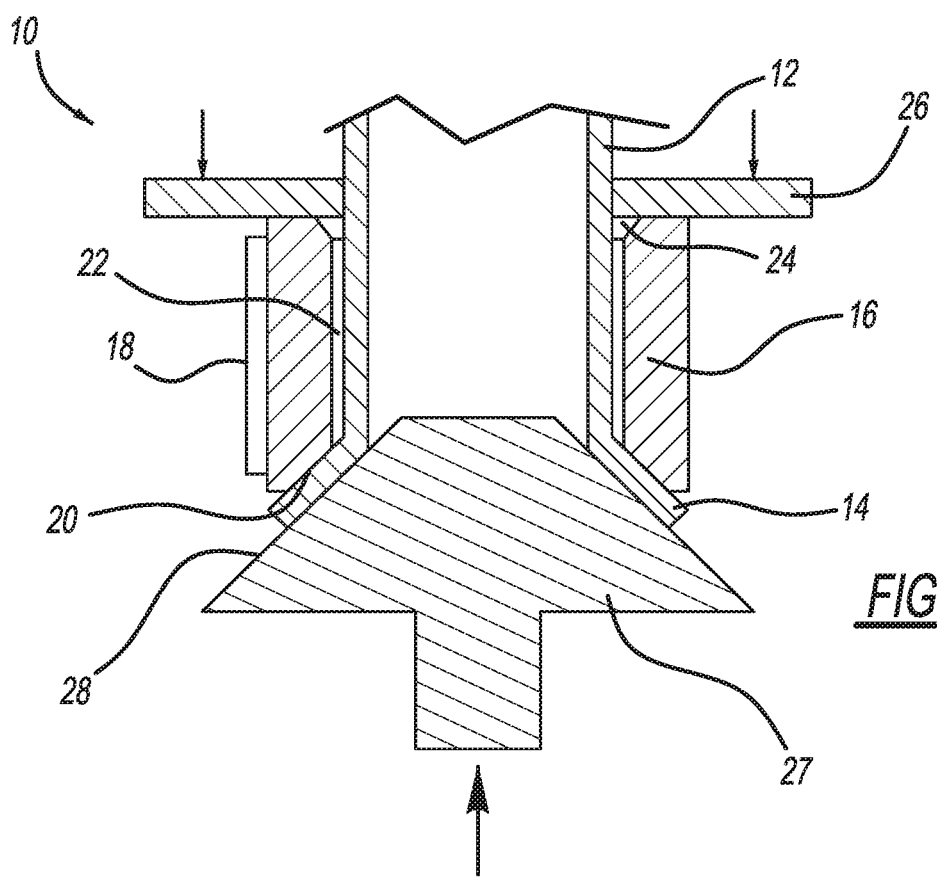
FIG. 2 is a sectional view of the exhaust gas pressure tube of FIG. 1 having a keyed washer illustrating a conical mandrel positioned to flare the open end of the tube.
Figure 3:
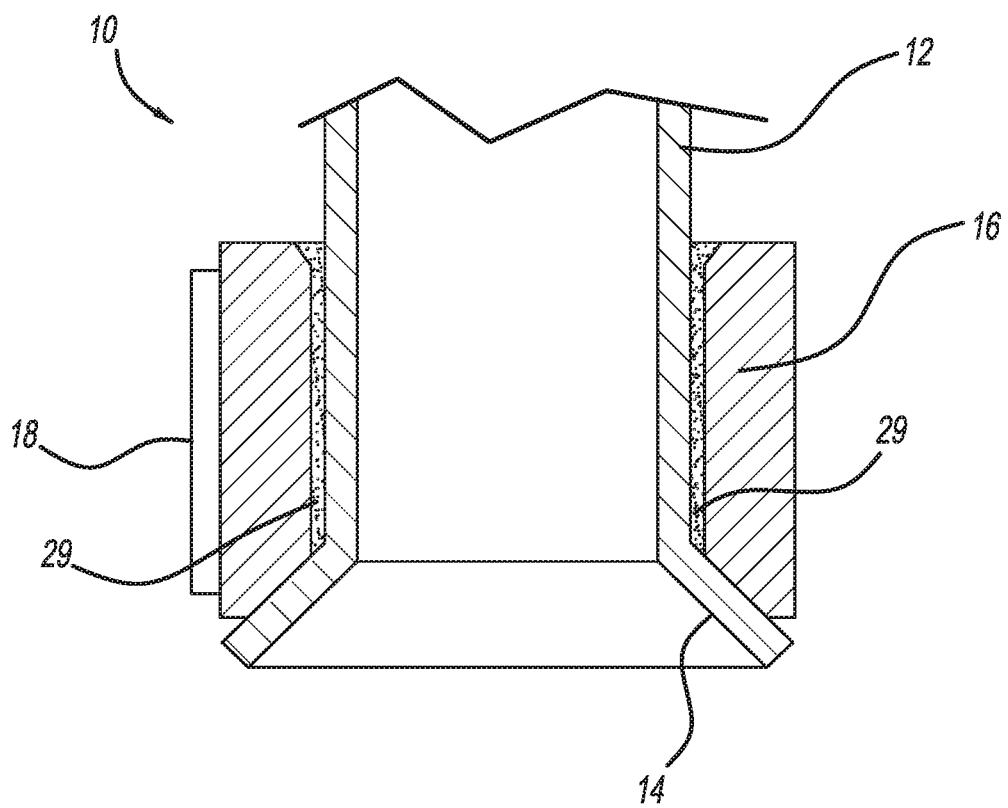
FIG. 3 is a sectional view of the exhaust gas pressure tube of FIG. 1 having a keyed washer in which the flared end of the tube has been fixedly attached to the conical interior wall of the keyed washer.

Referring to FIGS. 1-3, the method of assembling the keyed exhaust gas pressure tube according to one embodiment of the disclosed inventive concept is illustrated in sequential sectional views. In FIG. 1, an exhaust gas pressure tube assembly 10 according to the disclosed inventive concept is illustrated before flaring. The exhaust gas pressure tube assembly 10 includes an elongated exhaust gas pressure tube 12 composed of a material suitable for the purpose. The elongated exhaust gas pressure tube 12 includes two ends, of which one, an open end 14, is illustrated.

A washer 16 is positioned on the elongated exhaust gas pressure tube 12 adjacent the open end 14. An alignment key 18 is formed on at least one side of the washer 16. The alignment key 18 is provided to prevent rotation of the exhaust gas pressure tube assembly 10 from its installed position. The keyed washer 16 may be hardened or may be of a material that is sufficiently hard so as to transfer clamping force for sealing.

The washer 16 includes conical convex opening 20 having a smooth surface. The smooth surface is a characteristic of the disclosed inventive concept illustrated in FIGS. 1-3.

The washer 16 may be composed of a variety of materials, preferably metal. One non-limiting preferred but not exclusive material is Fe—Ni—Cr alloy, such as A-286 (product name of Incoloy®). This alloy has excellent high temperature oxidation resistance and maintains its high strength even at elevated temperatures. Once age-hardened, this material demonstrates high levels of strength to high temperatures up to about 700° C. Accordingly, this material is highly suitable for engine, manifold, exhaust and turbine applications.

A gap 22 is defined between the outer surface of the elongated exhaust gas pressure tube 12 and the inner wall of the washer 16. A bevelled end 24 is formed at the end opposite the conical convex opening 20.

To assure a proper tight seal is formed between the washer 16 and the exhaust gas pressure tube 12, the flared end of the tube 12 is formed after the washer 16 is in position. Once the washer 16 is properly positioned, a tool 26 is moved on one side of the washer 16 in preparation for the step of flaring.

After the tool 26 has been moved into position on the washer 16 as illustrated in FIG. 1, the flared end of the elongated exhaust gas pressure tube 12 is formed by insertion of a conical mandrel 27 into the open end 14 as illustrated in FIG. 2. The conical mandrel 27 includes a convex conical surface 28. The tool 26 applies force against the washer 16 while the conical mandrel 27 is inserted into the open end 14 while the open end 14 is flared upon insertion of the conical mandrel 27, preferably by being spun in place.

With the conical mandrel 27 held in the inserted position as illustrated in FIG. 2, the washer 16 is joined to the open end 14 by a method such as brazing or by another procedure under which the joining metal such as solder is flowed between the two components to form a sturdy and gas-tight seal. Preferably the brazing procedure is simultaneous heat or induction brazing. The washer 16 is preferably pre-coated with brazing material prior to assembly, although brazing material may be applied after the washer 16 is fitted to the pressure tube 12.

The completed exhaust gas pressure tube assembly 10 is illustrated in FIG. 3. As illustrated, a joining interface, such as an induction brazed interface 29, is illustrated between the smooth surface of the conical convex opening 20 and the outer surface of the flared open end 14 of the elongated exhaust gas pressure tube 12.

Figure 4:
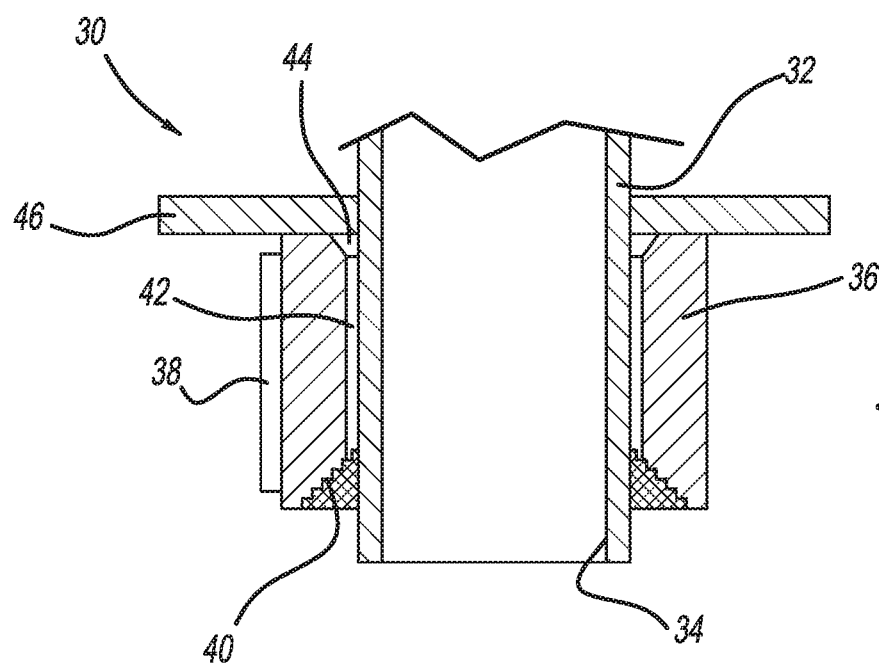
FIG. 4 is a sectional view of an exhaust gas pressure tube having a keyed washer preliminarily positioned near one end of the tube according to a second embodiment of the disclosed inventive concept, the keyed washer having a conical interior wall, the conical wall having a knurled surface.
Figure 5:
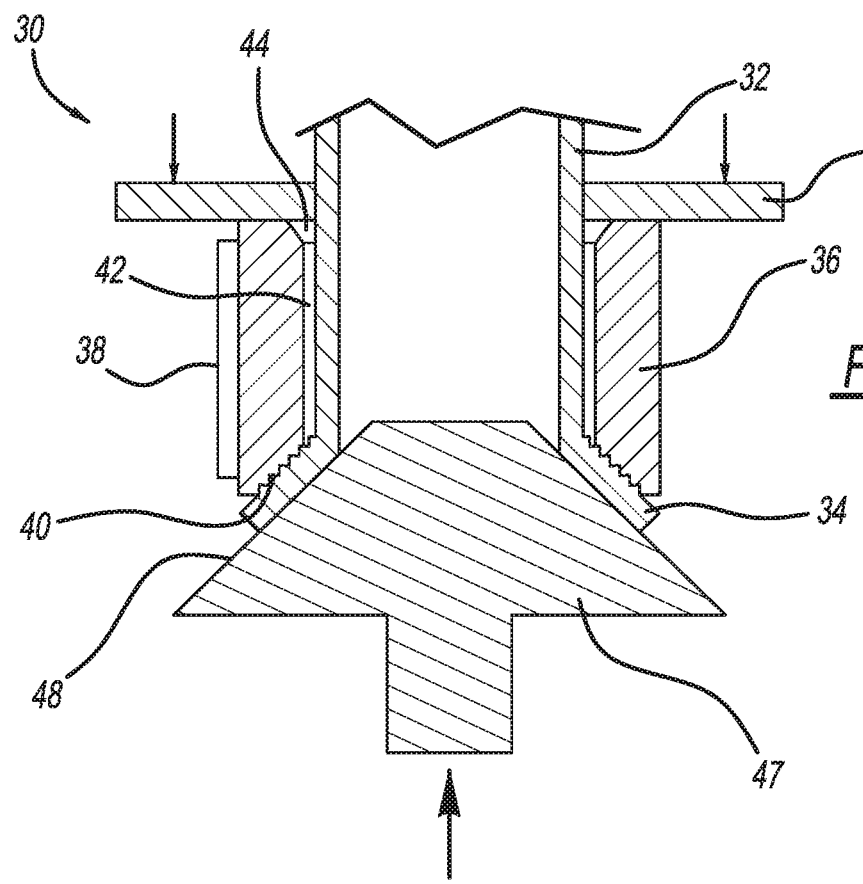
FIG. 5 is a sectional view of the exhaust gas pressure tube of FIG. 4 having a keyed washer illustrating a conical mandrel positioned to flare the open end of the tube.
Figure 6:
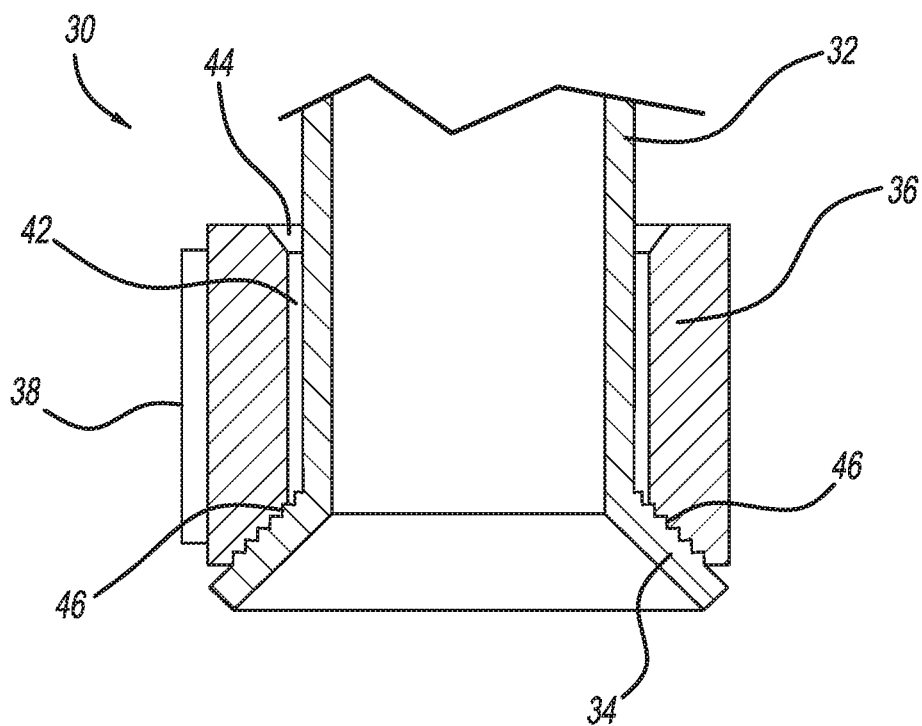
FIG. 6 is a sectional view of the exhaust gas pressure tube of FIG. 4 having a keyed washer in which the flared end of the tube has been fixedly attached to the conical interior wall of the keyed washer.

Referring to FIGS. 4-6, the method of assembling the keyed exhaust gas pressure tube according to another embodiment of the disclosed inventive concept is illustrated in sequential sectional views. With respect to FIG. 4, an exhaust gas pressure tube assembly 30 according to the alternate embodiment of the disclosed inventive concept is illustrated before flaring. The exhaust gas pressure tube assembly 30 includes a elongated exhaust gas pressure tube 32.

The elongated exhaust gas pressure tube 32 includes two ends. One of these, an open end 34, is illustrated. A washer 36 is positioned on the elongated exhaust gas pressure tube 32 adjacent the open end 34. An alignment key 38 is formed on at least one side of the washer 36. The alignment key 38 is provided to prevent rotation of the exhaust gas pressure tube assembly 30 from its installed position. A conical convex opening 40 is provided on the washer 36. The conical convex opening 40 has a knurled surface. Like the washer 16 described above with respect to FIGS. 1-3, the washer 36 may be formed from a variety of materials. And, also like the washer 16, the keyed washer 36 may be hardened or may be of a material that is sufficiently hard so as to transfer clamping force for sealing.
However, the preferred material is Fe—Ni—Cr alloy, such as the above-referenced A-286.

A gap 42 is defined between the outer surface of the elongated exhaust gas pressure tube 32 and the inner wall of the washer 36. A bevelled end 44 is formed at the end opposite the conical convex opening 40.

To assure a proper tight seal is formed between the washer 36 and the exhaust gas pressure tube 32, the flared end of the tube 32 is formed after the washer 36 is in position. Once the washer 36 is properly positioned, a tool 46 is moved on one side of the washer 36 in preparation for the step of flaring.

In the same manner as forming the flared end of the exhaust gas pressure tube assembly 10 described above and after the tool 46 has been moved into position on the washer 36 as illustrated in FIG. 4, the flared end of the elongated exhaust gas pressure tube 32 is formed by insertion of a conical mandrel 47 into the open end 34 as illustrated in FIG. 5. The conical mandrel 47 includes a convex conical surface 48. The tool 46 applies force against the washer 36 while the open end 34 is flared upon insertion of the conical mandrel 47, preferably by being spun in place.

The completed exhaust gas pressure tube assembly 30 is illustrated in FIG. 6. As illustrated, the outer surface of the flared open end 34 of the elongated exhaust gas pressure tube 32 is mated with the knurled surface of the conical convex opening 40. This arrangement renders unnecessary the need for brazing while still providing a gas-tight seal.

Figure 7:
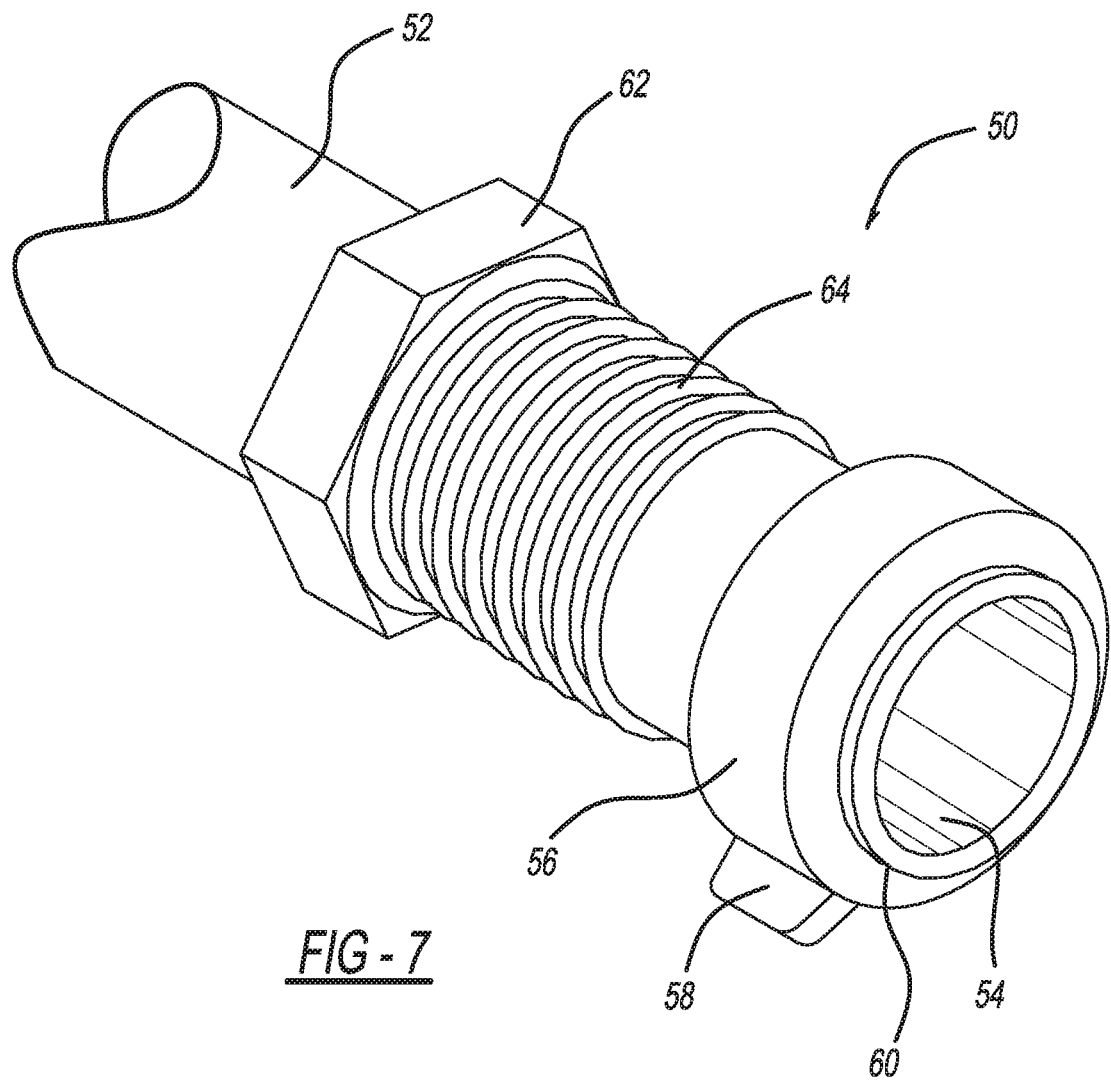
FIG. 7 is a perspective view of the flared exhaust gas pressure tube having a keyed washer according to the disclosed inventive concept with an adjacent packing nut.

Regardless of the selected method of assembly, the completed exhaust gas pressure tube assembly of the disclosed inventive concept results in a flared exhaust gas pressure tube that is tightly mated to the keyed washer without gaps or any other openings. An example of a completed exhaust pressure tube assembly of the disclosed inventive concept is illustrated in perspective view in FIG. 7 in which an exhaust gas pressure tube assembly 50 is illustrated. The exhaust gas pressure tube assembly 50 includes an elongated pressure tube 52 having a flared end 54 mated with a washer 56. The washer 56 has a direction-fixing key 58 formed thereon.

An interface 60 is formed between the outer surface of the flared end 54 of the pressure tube 52 and the conical concave surface of the washer 56. The interface 60 may be achieved by either brazing as described above with respect to FIGS. 1-3 or by way of knurling the conical concave surface of the washer 56 as described above with respect to FIGS. 4-6.

A thrust nut 62 having fastening threads 64 is slidably and rotatably positioned on the elongated pressure tube 52. The thrust nut 62 is threadably attached to the attachment boss conventionally formed on the exhaust manifold. Because of the gas-tight seal formed between the outer surface of the flared end 54 of the pressure tube 52 and the conical concave surface of the washer 56, the clampload of the thrust 62 relative to the manifold boss creates a properly and completely sealed joint between the exhaust gas pressure tube assembly 50 and the exhaust manifold boss.

Thus, the disclosed invention as set forth above overcomes the challenges faced by known approaches to efficiently forming an exhaust gas pressure tube assembly and attaching the tube assembly to the exhaust manifold boss while maintaining both a gas-tight seal and a true orientation of the tube once attached. The exhaust gas pressure tube assembly is of relatively low cost to manufacture and thus helps to keep manufacturing expenses to a minimum. In addition, the properly oriented exhaust gas pressure tube assembly is easy to attach and detach, thus minimizing time required for servicing the vehicle. However, one skilled in the art will readily recognize from such discussion, and from the accompanying drawings and claims that various changes, modifications and variations can be made therein without departing from the true spirit and fair scope of the invention as defined by the following claims.

What is claimed is:

1. An exhaust gas pressure tube assembly comprising:
   an exhaust gas pressure tube having a flared end, said end having an outer surface; and
   a keyed washer having an elongated key and a conical opening, said elongated key having a first end, a second end opposed to said first end, and two opposed flat sides extending between said first end and said second end, a said opening having a surface, said outer surface of said flared end being mated with said surface of said opening.

2. The exhaust gas pressure tube assembly of claim 1 wherein said keyed washer is formed from a hardened metal.

3. The exhaust gas pressure tube assembly of claim 1 wherein said surface of said opening is smooth.

4. The exhaust gas pressure tube assembly of claim 1 wherein said surface of said opening is knurled.

5. The exhaust gas pressure tube assembly of claim 1 wherein the assembly includes a threaded pack nut.

6. The exhaust gas pressure tube assembly of claim 1 wherein said flared end has an inner surface, said inner surface being parallel with said surface of said opening.

7. The exhaust gas pressure tube assembly of claim 1 wherein said washer is formed from Fe—Ni—Cr alloy.

8. An exhaust gas pressure tube assembly comprising:
   a keyed washer having an elongated key and a conical side, said elongated key having a first end, a second end opposed to said first end, and two opposed flat sides extending between said first end and said second end; and an exhaust gas pressure tube having an end said end being flared against said conical concave side of said washer to nest and mate therewith.

9. The exhaust gas pressure tube assembly of claim 8 wherein said conical concave side is smooth.

10. The exhaust gas pressure tube assembly of claim 8 wherein said conical concave side is knurled.

11. The exhaust gas pressure tube assembly of claim 8 wherein the assembly includes a threaded pack nut.

12. The exhaust gas pressure tube assembly of claim 8 wherein said washer is formed from Fe—Ni—Cr alloy.

* * * * *